J. J. MURRAY.
SPARE TIRE CASE.
APPLICATION FILED FEB. 26, 1908.
940,543.  Patented Nov. 16, 1909.
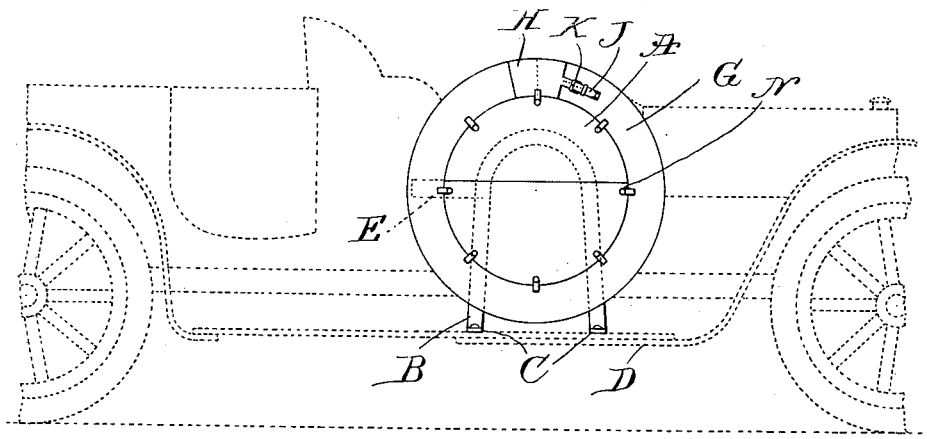
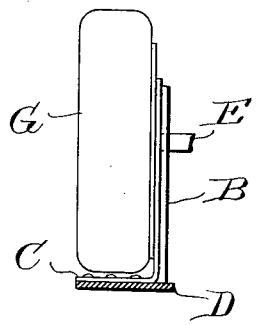
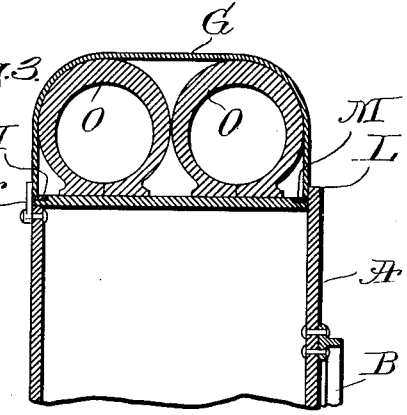
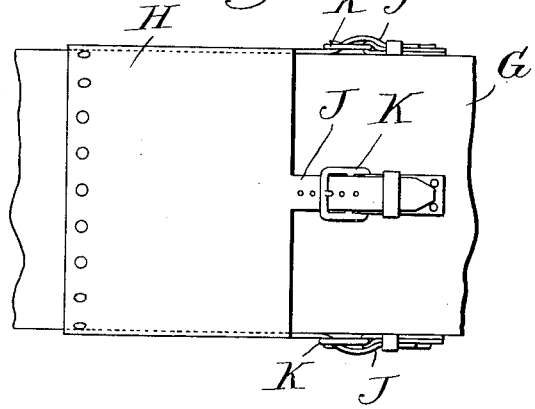
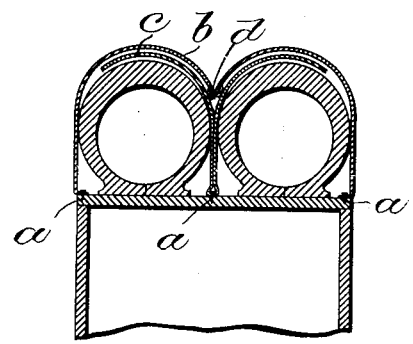
Witnesses:
Thomas J. Drummond
Joseph M. Ward
Inventor.
Joseph J. Murray,
by Crosby & Gregory, Attys.

UNITED STATES PATENT OFFICE.

JOSEPH JOHN MURRAY, OF NEWTON, MASSACHUSETTS.

SPARE-TIRE CASE.

940,543.　　　　Specification of Letters Patent.　　Patented Nov. 16, 1909.

Application filed February 26, 1908.　Serial No. 417,813.

*To all whom it may concern:*

Be it known that I, JOSEPH J. MURRAY, a citizen of the United States, and a resident of Newton, in the county of Middlesex and State of Massachusetts, have invented an Improvement in Spare-Tire Cases, of which the following description, in connection with the accompanying drawing, is a specification, like letters on the drawing representing like parts.

This invention relates to a spare tire case for vehicles, and is particularly adapted for use in connection with automobiles, where it is necessary to carry one or more spare tires.

The invention is designed to present a case, the interior of which may be used as a tool or storage box, and which will support the tires in compact, readily accessible position and will protect the tires from dust, moisture and injury.

The invention will more fully appear from the accompanying description and drawings, and will be particularly pointed out in the claims.

The drawings represent the tire case in its preferred forms.

Figure 1 is a front elevation of a preferred form of the tire case embodying the invention, in position on an automobile represented in dotted lines. Fig. 2 is a side view of the tire case and its support shown in Fig. 1. Fig. 3 is a central vertical cross section enlarged of a portion of the tire case shown in Fig. 1. Fig. 4 is a detail view of the contracting means of the tire case shown in the preceding figures. Fig. 5 is a view similar to Fig. 3 of another form of tire case embodying the broad features of the invention.

The tire case comprises a cylindrical box A of a diameter as nearly the interior diameter of the tires to be carried as possible, and the periphery of which is equal in width to one or two tires as desired. The box is preferably closed at its front and rear to present an inclosed space which may be used as a tool or storage box. The box A is supported in an upright position on the vehicle in a suitable manner. When used for an automobile, as illustrated in Fig. 1 a U-shaped support B of T or angle iron is bolted to the rear wall of the box A and bent to form feet C which are bolted to the running-board D of the automobile. A rod E connected with the box or support B and to the vehicle body may also be employed to steady the box against lateral vibration. The outer periphery of the box, together with a cover therefor, constitutes the tire casing. This cover is connected to the box in such a manner as to prevent lateral movement thereon, and is provided with means by which it may be contracted so as to hold the tire in position.

In the drawings, the parts are illustrated of such a size and construction as to provide for two spare tires, but the modification necessary to carry one tire will be obvious.

The drawings illustrate two forms of the invention. That shown in Figs. 1–4 inclusive is the preferred form, and is made the subject of the more specific claims in this application. That shown in Fig. 5 embodies the broad features of the invention. The cover G of the first form illustrated is made of some rigid, firm, self-sustaining material, such as sheet iron or other sheet metal, and is U-shaped in cross section, the width depending upon the number of tires to be inclosed. It is split transversely and at one end has riveted thereto a piece of leather H, provided with straps J, while the other end is provided with buckles K, so that the ends of the cover may be drawn together to contract the same. The rear side of the box A is extended upwardly at L to form a projecting circumferential flange, and the periphery of the box near each edge is preferably provided with a rubber gasket M. The face of the box is provided with a series of buttons N.

In operation the tires O are placed within the cover G, the buttons N turned inward and the cover with the inclosed tire slipped on to the periphery of the box, until the edge of the cover G comes against the flange L and both edges of the cover rest on the gaskets M. The buttons are then turned up into position against the outer edge of the cover G and the straps K are drawn up until the edges of the cover G are pressed down into the gaskets M and the tires are held firmly in position. It will thus be seen that a tire case is presented in which the tires are fully protected from dust, moisture and injury, and yet are readily accessible when desired. At the same time a neat appearance is secured, and space provided in the interior of the case which can be utilized as a tool or storage box.

The advantages of the broad features of the invention are obtainable in other forms than that already described. One such form is illustrated in Fig. 5. In that construction the cover (two of which covers are shown for two tires) is made of a flexible waterproof material, such as enameled cloth or imitation leather. The edges of the cover are prevented from lateral movement on the periphery of the box by being fastened firmly thereto by tacks $a$, or other securing means. The cover is split longitudinally so as to form in fact two flaps $b$, $c$, and the outermost flap $b$ is provided at its free edge with a cord $d$, by which it can be drawn and fastened into as small a circle as possible, thereby contracting the cover and holding the inclosed tire firmly in position.

Having described my invention, what I claim as new and desire to secure by Letters Patent, is:

1. A device such as described, comprising a cylindrical box, a support for said box fastened to the rear face thereof and to the running-board of the vehicle adapted to maintain it in upright position, and means for maintaining a vehicle tire in position concentric to the periphery of said box.

2. A device such as described, comprising a cylindrical box, a support for said box fastened to the rear face thereof and to the running-board of the vehicle adapted to maintain it in upright position, and means for maintaining a vehicle tire in position concentric to the periphery of said box including a device extending from one peripheral edge of the box over said tire to the other peripheral edge.

In testimony whereof, I have signed my name to this specification, in the presence of two subscribing witnesses.

JOSEPH JOHN MURRAY.

Witnesses:
    THOMAS J. DRUMMOND,
    EMILY C. HODGES.